No. 646,142.  
W. G. DAVIS.  
DRAFT APPARATUS FOR VEHICLES.  
(Application filed Oct. 16, 1899.)  
Patented Mar. 27, 1900.

(No Model.)  
2 Sheets—Sheet 1.

Witnesses.  
Thomas J. Drummond,  
Fred S. Greenleaf.

Inventor.  
Wilbur G. Davis,  
by Crosby & Gregory, Attys.

No. 646,142. Patented Mar. 27, 1900.
W. G. DAVIS.
DRAFT APPARATUS FOR VEHICLES.
(Application filed Oct. 16, 1899.)
(No Model.) 2 Sheets—Sheet 2.
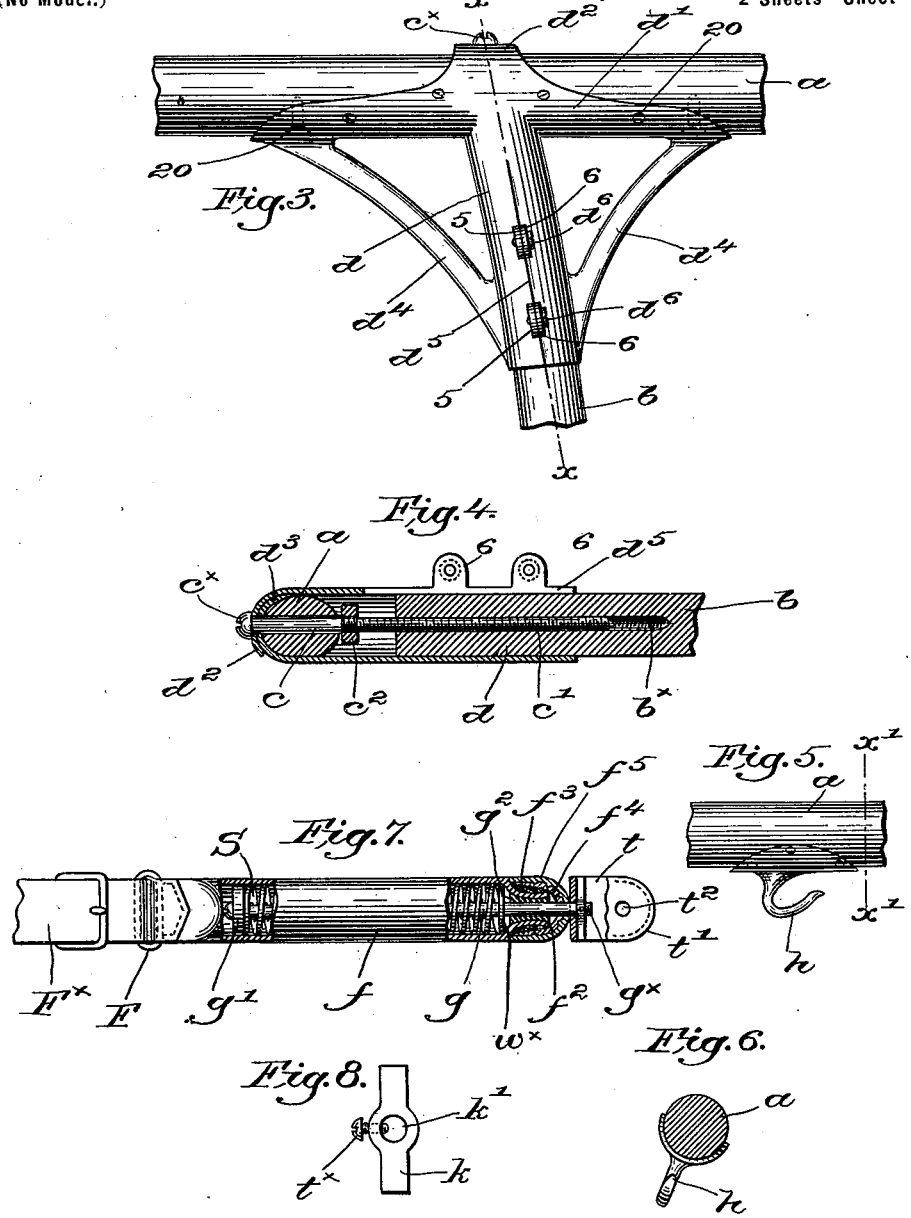

UNITED STATES PATENT OFFICE.

WILBUR G. DAVIS, OF NEWTON, MASSACHUSETTS.

DRAFT APPARATUS FOR VEHICLES.

SPECIFICATION forming part of Letters Patent No. 646,142, dated March 27, 1900.

Application filed October 16, 1899. Serial No. 733,714. (No model.)

*To all whom it may concern:*

Be it known that I, WILBUR G. DAVIS, a citizen of the United States, residing at Newton, county of Middlesex, State of Massachusetts, have invented an Improvement in Draft Apparatus for Vehicles, of which the following description, in connection with the accompanying drawings, is a specification, like letters and figures on the drawings representing like parts.

This invention relates to draft apparatus for single-hitch vehicles, especially adapted for use with light road-wagons or other vehicles and in connection with harness such as shown and described in United States Patent No. 605,632, granted to me June 14, 1898, and I have embodied in my present invention certain improvements of the draft apparatus shown in my United States Patent No. 623,705, dated April 25, 1899. As in both of said patents, I have herein obviated the use of a whiffletree, prevented the disagreeable and unnecessary flapping of traces, and increased the freedom of movement of the horse, while at the same time I have herein enlarged the adaptability of the apparatus to different vehicles. I have provided means for readily and quickly varying the width of the shafts, so that one draft apparatus can be used for a number of vehicles of different widths. I have also increased the strength of the shafts by a new application of the draft members thereto, while retaining all the advantages set forth in my patents referred to. While providing for the adjustment of the shafts as to width, I have also so constructed them that the application of the usual shaft irons or couplings is in no wise interfered with or complicated—a very important feature in practice.

Other novel features of my invention will be hereinafter described, and particularly pointed out in the following claims.

Figure 1:
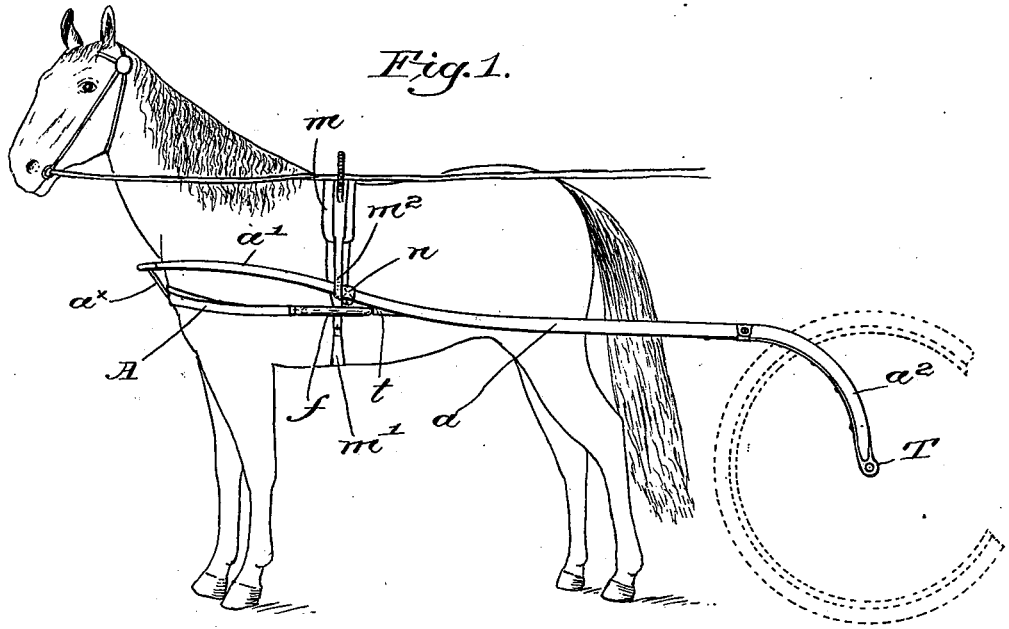
Figure 2:
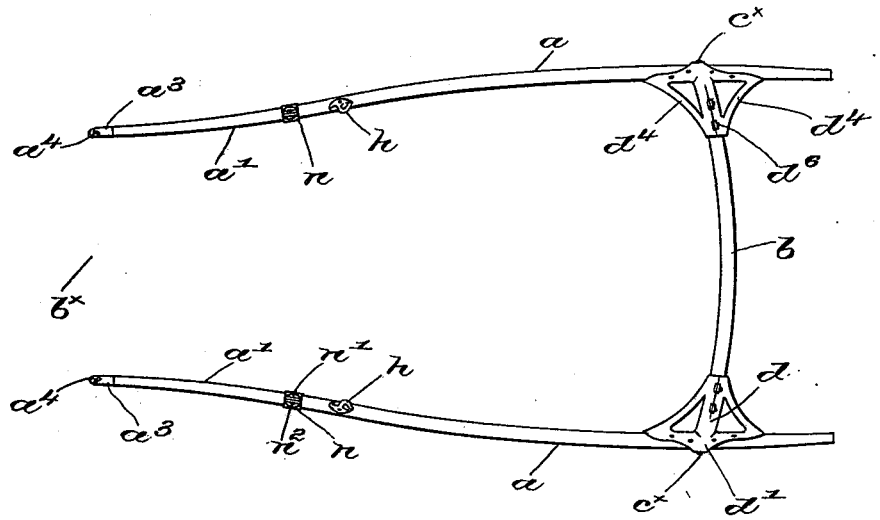

Figure 1 in side elevation represents one embodiment of my invention, a horse being shown harnessed in order to clearly illustrate my invention. Fig. 2 is an under side view of the shafts, showing the connections between the shafts and cross-bar, the attachments for the shaft members, and the tug-leathers. Fig. 3 is an enlarged under side view of one of the connections between the shaft and cross-bar. Fig. 4 is a longitudinal section thereof on the line $x\,x$, Fig. 3. Fig. 5 is an enlarged side elevation of one of the attaching devices for the draft members. Fig. 6 is a cross-section through the shaft on the line $x'\,x'$, Fig. 5, looking toward the left. Fig. 7 is an enlarged view, partly broken out, of one of the draft members, a portion of the connecting-strap between it and the breast-collar being shown; and Fig. 8 is a detail to be referred to.

In carrying out my present invention the shafts, which may be of hickory or any other suitable tough and at the same time light material, comprise body portions $a$, which lie in substantially the same transverse plane, as will be apparent from Fig. 1, the shafts tapering from the leading ends of the body portions and being bent upward toward their tips, as at $a'$, the shafts near their tips thus being considerably higher than the body portions for a purpose to be hereinafter described, the downwardly-turned rear ends $a^2$ of the shafts being provided with thill-couplings T of any suitable construction.

Referring to Fig. 2, it will be seen that the body portions of the shafts are slightly bent outward, and the front portions $a'$ are bent in, so that the shafts may properly fit the body of the horse, while allowing perfect freedom of movement.

Many individuals own a number of vehicles, to any one of which my draft apparatus is adapted; but as it is not only expensive, but inconvenient, to provide such an apparatus for each and every vehicle I have herein provided means for varying the width of the shafts at their rear ends, so that they may be adjusted readily and quickly to vehicles of different widths.

I have herein shown the cross-bar $b$ as rearwardly curved and preferably struck from a center $b^\times$, which is a point substantially midway between the tips of the shafts, as clearly shown in Fig. 2, so that the lateral movements of the shafts at their rear ends toward or from each other will effect very little change in the distance between the front ends of the shafts.

Each shaft is provided with a metal fitting or bracket comprising, as herein shown, a socket $d$, extended inwardly from a longitudinally-extended base portion $d'$, which is fitted to extend around a portion of the shaft at its inner side, the base adjacent the socket being preferably extended to form ears $d^2 d^3$, (see Fig. 4,) which are overlapped, the base being secured to the shaft in any suitable manner, as by screws 20. The socket is at its open end connected with the extremities of the base by fore and aft braces $d^4$, which serve to make the whole fitting rigid and firm. The socket is longitudinally slotted on its under side, as at $d^5$, so that it may be extended or contracted, as desired, upturned ears 5 and 6 at the opposite sides of the slot $d^5$ being provided with suitable clamping-screws $d^6$, by which the walls of the socket are drawn together, said socket receiving the end of the cross-bar and conforming to the slight curvature thereof, so that the said cross-bar can be moved farther out of the socket and still be firmly held therein.

In order to provide an adjustable, yet rigid, connection between the cross-bar and the shafts, I have herein shown a bolt $c$, having a long threaded shank $c'$, the smooth portion of the bolt extending and being rotatable in a suitable hole made in the shaft, the head $c^\times$ of the bolt being seated on the overlapped ears of the bracket-base, as herein shown, and in order to prevent longitudinal movement of the bolt relative to the shaft I provide a collar $c^2$, Fig. 4, which is screwed up firmly on the threaded shank to the proper position, so that while the bolt may be rotated it cannot move longitudinally. The threaded end of the bolt is extended into and engages a threaded hole $b^\times$ formed in the end of the cross-bar, and obviously when the clamp and screws $d^6$ are loosened the cross-bar $b$ may be moved in or out by rotating one or both of the adjustable connecting-bolts $c$ in the proper direction. When the desired adjustment has been made, with the thill-couplings in the shaft ends at the proper distance apart, the sockets are clamped firmly upon the ends of the cross-bar, so that the latter and the shafts are rigidly and strongly connected.

In my present invention I dispense with the usual traces, and the construction shown in my patents hereinbefore referred to has been materially changed in that in said patents the draft members which took the place of the usual traces were extended for a greater or less distance through hollow or tubular portions of the shafts, whereas herein I make use of short and longitudinally-yielding draft members, but external to the shafts entirely, so that the latter are not weakened in any manner.

The harness which I prefer to use in connection with this draft apparatus comprises, essentially, a belly-band $m'$, having the usual saddle-harness $m$, with shaft-tugs $m^2$ depending from the saddle to receive the shafts, (see Fig. 1,) and I dispense with the usual breeching by providing tug-leathers $n$, preferably made as collars of thick leather, encircling the shafts and provided with metal ears $n'$, rigidly held together by a clamp-screw $n^2$. (See Fig. 2.)

When the motion of the vehicle is to be retarded by the horse, the shaft-tugs bear against the front sides of the leathers $n$, and as the horse holds back the vehicle will thereby be held back, and in order to make the swing or vibration of the shaft-tugs as small as possible the shafts are raised or upturned beyond the leading ends of the body portions $a$, as clearly shown in Fig. 1, to bring that part of the shaft adjacent the belly-band as high as possible.

By adjusting the tug-leathers the apparatus can be adjusted for horses of different lengths.

I prefer to use a breast-strap A, Fig. 1, or a hames-collar of any suitable construction connected by the draft members, to be described, with the shafts in such manner that the point of application of the power to the shafts is at the leading ends of the body portions of the shafts, so that under normal conditions the straight portions of the shafts and the draft members will be substantially in alinement in order to attain the most direct and available application of power to the vehicle. By connecting the draft members at such portions of the shafts I also decrease to substantially a minimum any horse motion.

I have herein shown the shafts as provided with tubular metallic tips $a^3$, each preferably having a slot $a^4$ therein, (see Fig. 2,) and through these slots a thong or like strap $a^\times$ is passed and connected with the front of the breast strap or collar A in any suitable manner to hold the same up in proper place and prevent it from dropping down over the breast of the horse when the draft members are slack, obviating the use of a neck-strap, if desired.

Behind the tug-leathers $n$ I have secured to the under sides of the shafts rearwardly-open hooks $h$, (shown on a larger scale in Figs. 5 and 6,) said hooks being inclined toward each other in order to bring the point of attachment of each draft member on the inner and under side of the shaft, as shown in Figs. 2 and 6.

The draft members are somewhat similar in construction to the draft members in my Patent No. 623,705 referred to, but with certain changes in construction to adapt them to their new location exterior to rather than within and protected by the shafts.

Each draft member comprises a tubular portion $f$, of leather, closed at one end over the head $g'$ of a spring-support $g$, shown as a rod extended through a collar $g^2$, of rubber or some other suitable non-metallic material, inserted in the other end of the tubular portion and being crimped, as at $f^2$, Fig. 7, about the collar, to the concave exterior of which it is rigidly secured by waxed thread or wire $f^3$, tightly wrapped around the crimped portion. A draft-spring S within the tubular portion $f$ is interposed between the collar $g^2$ and the head $g'$ of the spring-support, the end of the spring nearest the collar being shown in Fig. 7 as rested on a washer $w^×$. I have herein shown a flat loop F as secured to the closed end of the tubular portion opposite the end containing the collar, said loop receiving a strap $F^×$, provided with a suitable buckle and attached to the breast-collar, so that the latter can be readily adjusted to the length of the horse. A cap $f^4$, of metal and coarsely threaded interiorly, is screwed over the wrapping $f^3$, which holds the crimped end of the leather onto the collar, and over this I preferably screw in any suitable manner a hard-rubber cap $f^5$, which protects the end of the tubular part $f$ and also gives a neat finish.

The end of the spring support or rod $g$ extends loosely through the collar $g^2$ and the cap and is threaded at its end, as at $g^×$, Fig. 7, to receive thereon an anchor $k$, which is transverse to the rod, said anchor having a threaded opening $k'$, Fig. 8, to screw upon the rod. The anchor is inclosed within a piece of leather $t$, folded around it, and with its two plies sewed together, as by stitching or otherwise, as at $t'$, Fig. 7, and provided with an opening $t^2$ to slip over one of the hooks $b$ on the shaft. The end of the rod $g$ passes through a hole in the bent portion of the folded leather and then into the threaded opening $k'$ of the anchor, and in order to prevent accidental disconnection of the leather $t$, which I shall hereinafter term the "eye," and the spring-support by relative rotation thereof I provide a locking-screw $t^×$, which passes through the material forming the eye and is tapped into the enlarged portion of the anchor, (see Fig. 8,) the end of the locking-screw being long enough to enter a slight depression or bight in the rod $g$. When the locking-screw is turned home, it will be obvious that no relative rotation of the anchor and spring-support can take place.

The spring-support is manifestly anchored by its connection with the shaft-hook $h$, and the power of the horse applied through the breast-collar is transmitted to the tubular part $f$ of the draft member, the spring S being compressed more or less between the head $g'$ of the spring-support and the collar $g^2$, according to the amount of resistance encountered by the vehicle.

All of the working parts of the draft member are thoroughly and well protected from the action of weather or from dust, and as the draft members are short there is practically no opportunity for their flapping or flying about.

The freedom of movement of the horse is practically unimpaired, while horse motion is to all intents and purposes eliminated.

With a draft apparatus embodying my invention the user can apply it to any number of vehicles of different widths in a very short time, as it is only necessary to unclamp one or both of the sockets, preferably both, and adjust the shafts to the proper width and thereafter clamp the sockets.

The heads of the adjustable bolts and of the clamping-screws or bolts may be made either to fit a wrench or to be operated by an ordinary screw-driver, and I have shown the latter construction herein.

It will be noticed by referring to Fig. 1 that the ironing of the shafts is not interfered with in any way by the brackets, as the shaft-irons are merely passed over the parts of the brackets which intervene between the horse and the shafts—a very important feature in actual practice, as it obviates the necessity of carefully fitting each iron to its shaft with more or less hand work to effect the fitting. The brackets may be made in any suitable manner, preferably stamped or struck up from sheet metal of sufficient thickness to give the requisite strength and rigidity to the parts.

My invention is not restricted to the precise construction and arrangement shown, as the same may be modified or varied without departing from the spirit and scope of my invention.

By the construction herein shown it will be noticed that the shafts can be readily shipped without crating, as the cross-bar can be removed, the two shafts laid up close together, and, with the cross-bar, made up into a compact bundle of small compass, and not liable to breakage or injury in transit.

The ordinary vehicle-shafts are delicate and awkward to ship, as they must be carefully inclosed in a large crate, owing to the fact that they are rigidly connected with the cross-bar.

Common harness can be used with my shafts herein shown if desired or necessary, as it will be manifest that a whiffletree can be readily attached to the cross-bar and ordinary traces used, in such case the draft members herein shown not being used.

Having described my invention, what I claim as new, and desire to secure by Letters Patent, is—

1. Vehicle-shafts, a cross-bar, and adjustable means to rigidly connect it and the shafts, whereby the distance between the latter may be varied.

2. Vehicle-shafts, a rearwardly-curved cross-bar, and an adjustable connection between the shafts and the cross-bar, whereby the distance between the rear ends of the shafts may be varied.

3. Vehicle-shafts, and means to adjustably and rigidly connect their rear ends whereby the distance between the rear ends of the shafts may be varied without substantially varying the distance between their tips.

4. Vehicle-shafts, a rearwardly-curved cross-bar between them, struck from a center substantially midway between the shaft-tips, and means to adjustably connect the cross-bar and shafts, whereby the distance between the rear ends of the latter can be varied.

5. Vehicle-shafts, a rearwardly-curved cross-bar, socketed members rigidly secured to the shafts, to receive the ends of the cross-bar, and adjustable devices connecting the shafts and cross-bar, whereby the distance between the shafts can be varied.

6. Vehicle-shafts, a rearwardly-curved cross-bar, members rigidly secured to the shafts and having expansible sockets to receive the ends of the cross-bar, means to clamp the sockets thereupon, and adjustable devices connecting the cross-bar and shafts, to vary the distance between the latter.

7. Vehicle-shafts, a rearwardly-curved cross-bar, brackets secured to the shafts and each having an inwardly-projecting, expansible socket to receive the ends of the cross-bar, means to clamp the sockets thereupon, and a rotatable and non-longitudinally-movable bolt extended through each shaft and into a threaded hole in the end of the cross-bar, rotation of a bolt varying the distance between the cross-bar and adjacent shaft.

8. Vehicle-shafts each having attached to it an inwardly-extended, expansible socket having an elongated base to rest upon and partly overlap the shaft, fore and aft braces between the base and the open end of the socket, a rearwardly-curved cross-bar whose ends enter the sockets, means to clamp the sockets on the cross-bar, and adjustable connections between the shafts and the cross-bar, seated in the overlapped portions of the socket-base and in the shaft.

9. Vehicle-shafts having their body portions in the same transverse plane, and upwardly bent therefrom to their tips, longitudinally-yielding draft members exterior to the shafts, and detachable connections between said members and the shafts, said connections being located at or near the front ends of the body portions of the latter.

10. Vehicle-shafts having their body portions in the same transverse plane and upwardly bent therefrom to their tips, longitudinally-yielding draft members exterior to the shafts, and connections between the draft members and the shafts, said connections being located at or near the front ends of their body portions.

11. Draft apparatus for vehicles, comprising shafts upraised from the leading ends of their body portions to their tips, a tug-leather adjustable on the curved portion of each shaft, and short and longitudinally-yielding draft members wholly exterior to and connected with the shafts at or near the leading ends of their body portions.

12. Draft apparatus for vehicles, comprising shafts, rearwardly-open hooks on the under sides of the shafts at or near the leading ends of their body portions, and short, longitudinally-yielding draft members wholly exterior to the shafts and adapted at their other ends to detachably engage the hooks on the shafts.

13. In draft apparatus for vehicles, shafts, a hook on each at or near the leading end of its body portion, draft members each comprising a tubular portion with closed ends, a spring-support extended through one end and threaded at its exposed extremity, a draft-spring interposed between the inner end of the spring-support and the end of the tubular portion, an eye to engage the shaft-hook, an anchor extended transversely through the eye and adapted to screw upon the end of the spring-support and a locking device to prevent accidental relative rotation of said support and the anchor.

14. In draft apparatus for vehicles, a longitudinally-yielding draft member consisting of a tubular portion, a collar upon which one end of said portion is crimped and secured, a protective cap exteriorly applied to said end, a headed rod within the tubular portion and extended loosely through said collar and cap, a draft-spring interposed between the head and the collar, an anchor adapted to screw upon the exposed end of the rod, a flexible eye folded about the anchor, and a retaining-screw adapted to pass through the material of the eye and the anchor and into the rod, to prevent relative rotation of said rod and anchor.

In testimony whereof I have signed my name to this specification in the presence of two subscribing witnesses.

WILBUR G. DAVIS.

Witnesses:
JOHN C. EDWARDS,
AUGUSTA E. DEAN.